United States Patent [19]
Takagi et al.

[11] Patent Number: 4,812,426
[45] Date of Patent: Mar. 14, 1989

[54] LEAD-CONTAINING OXIDE POWDER

[75] Inventors: Touichi Takagi, Tokyo; Kohei Ametani, Kanagawa; Kouichi Shimizu, Niigata, all of Japan

[73] Assignee: Denki Kagaku Kogyo Kabushiki Kaisha, Tokyo, Japan

[21] Appl. No.: 12,103

[22] Filed: Feb. 6, 1987

Related U.S. Application Data

[63] Continuation-in-part of Ser. No. 762,610, Aug. 5, 1985, abandoned.

[30] Foreign Application Priority Data

Aug. 21, 1984 [JP] Japan .................. 59-172425
Dec. 29, 1984 [JP] Japan .................. 59-278754
Feb. 12, 1986 [JP] Japan .................. 61-26746
Feb. 19, 1986 [JP] Japan .................. 61-34112

[51] Int. Cl.[4] .......................... C03C 35//46
[52] U.S. Cl. ..................... 501/136; 423/594; 423/598; 423/599; 423/600; 423/619; 428/404; 501/134; 501/135; 501/137; 501/138; 501/139
[58] Field of Search ............... 501/1, 134, 135, 136, 501/137, 138, 139; 423/594, 598, 599, 600, 619; 428/404

[56] References Cited

U.S. PATENT DOCUMENTS 4,339,544  7/1982  Sakabe et al. .................. 501/136

FOREIGN PATENT DOCUMENTS 2018237  10/1979  United Kingdom .............. 501/134

OTHER PUBLICATIONS

Swartz, S. et al., "Fabrication of Perovskite Lead Magnesium Niobate", Mat. Res. Bull., vol. 17, pp. 1245–1250, 1982.

Primary Examiner—Mark L. Bell
Attorney, Agent, or Firm—Jordan and Hamburg

[57] ABSTRACT

According to the invention a powder of lead-containing oxides and a process for preparing the same for the production of an element for electrical and other applications are provided. The powder is prepared by mixing and calcining a powder of oxides of metals other than lead, lead-containing oxides, metal substances forming the oxides upon calcination or mixtures thereof, adding and mixing a powder of a lead substance to obtain a mixture and then calcining the mixture. The powder includes a Perovskite type lead-containing oxides of the formula of $ABO_3$ wherein A is a metal element coordinated with 12 oxygen atoms and containing at least lead, and B is a metal element coordinated with 6 oxygen atoms. A phase containing the lead forms a skin layer of the powder.

30 Claims, 1 Drawing Sheet

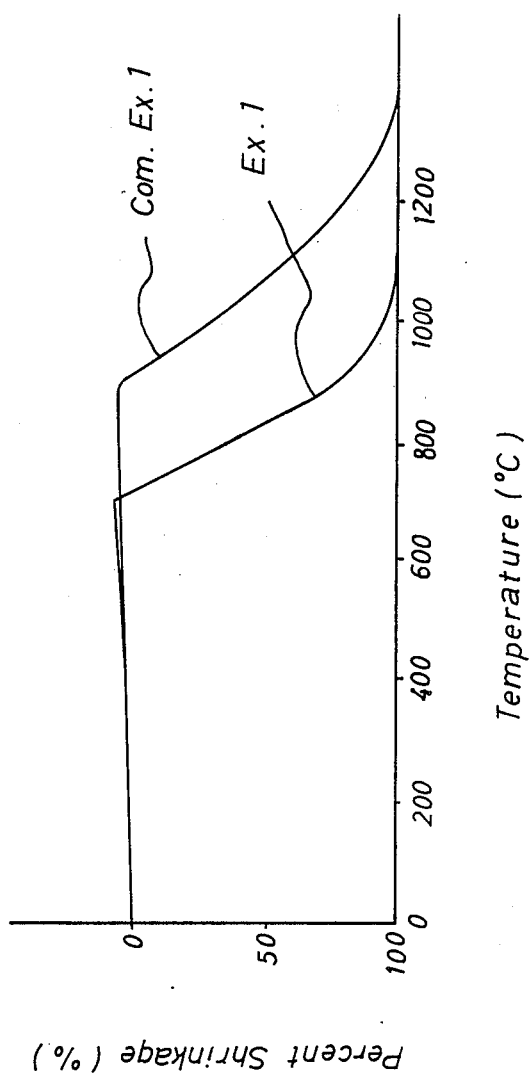

LEAD-CONTAINING OXIDE POWDER

CROSS-REFERENCE TO RELATED APPLICATION

This application is a continuation-in-part application of application Ser. No. 762,610 filed Aug. 5, 1985, now abandoned.

BACKGROUND OF THE INVENTION

1. Field of the Invention

This invention relates to a powder of lead-containing oxide for the production of an element for electrical, electrochemical and other various uses, and a process for preparing the same. This invention also relates to a sintered body and an element prepared from the lead-containing oxide powder.

2. Related Art Statement

There have been known, in the art, a variety of lead-containing oxide which may be used as dielectric materials having high dielectric constant; piezoelectric materials and a collector in electrical application. Accordingly, it is necessary to provide a powder of lead-containing oxide, which can be easily sintered to give a high density sintered article at a relatively low temperature and a process for preparing the powder.

It has been known that sintering of such a material may be accerelated by increasing the content of lead in the material to be sintered. (In this connection, reference should be made to "Research on Sintering of PbO and PZT", reported by Osamu Yamaguchi in "Powder and Powder Metallurgy" ("FUNTAI OYOBI FUNMATSU YAKIN"), Vol. 17, No. 3, Page 116.)

The prior art technology referred to above and disclosed by the preceding reports including Yamaguchi's article relates to a so-called liquid phase sintering mechanism wherein sintering is promoted or accelerated by the addition of lead oxide in an amount in excess of 10 to 60% of the stoichiometric quantity due to the presence of liquid phase of excess lead oxide during the step of sintering zirconium titanate. However, this known process has a disadvantage in that the excess lead oxide is left in the resultant sintered body to affect adversely the electrical or mechanical properties of the resultant products. The liquid phase sintering process has another disadvantage in that gas bubbles are hardly expelled from the molded mass during the sintering step since the mass under sintering, in general, abruptly shrinks at the initial stage of sintering. As a result, gaseous materials are enclosed in the sintered body to form an enormous number of minute voids in the product to lower the density thereof. This problem is not limited only to the production of a sintered body of zirconium titanate, but is commonly found in the preparation of a sintered body from a lead-containing powder by the conventional technology, particularly by the liquid phase sintering processes.

Another known process for producing a lead-containing oxide powder is a so-called solid phase calcining process wherein a powder composition containing lead oxides, metal oxides and metal carbonates is prepared to have a desired composition followed by calcination, and then the calcined body is pulverized and the pulverized powder is calcined again, the calcination and pulverizing cycles being repeated until a calcined body having desired properties is obtained. However, the resultant lead-containing oxide powders by the conventional solid calcining process have a disadvantage in that they must be sintered at a high temperature with an attendant excessive growth of powder particles to result in increase in average diameters thereof. The density of a sintered body prepared by the use of such a powder of large average particle size is low.

It is also known in the art that lead-containing ceramic elements, such as laminated ceramic condenser elements, or bimorph type or laminated type actuators, may be produced from a lead-containing oxide powder. Such an element for electrical or other various applications may be produced by a process wherein a lead-containing powder is mixed with an organic binder and other additives to prepare a mixture which is molded, and then a material for electrodes is printed or otherwise applied on the molded mass and is pressed at a temperature of about 100° C., followed by baking at a temperature of higher than 1200° C. However, since a molded mass of lead-containing oxide and a material for electrodes are baked at a high temperature, when a conventional lead-containing powder is used, the material for electrodes is limited to high melting point metals, such as platinum, rhodium, palladium and iridium, or alloys thereof or tungsten. As known, these metal materials are not only expensive but also high in electrical resistivity, and thus they are not adapted for use in high speed electronic circuits or high density electrical equipment or integrated circuits.

OBJECTS AND SUMMARY OF THE INVENTION

A primary object of this invention is to provide a lead-containing oxide powder, which may be sintered at a lower temperature to form a high density sintered body and a process for preparing the same.

Another object of this invention is to provide a lead-containing oxide powder, from which an element having improved electrical and mechanical properties can be prepared and a process for preparing the powder.

A further object of this invention is to provide a lead-containing oxide powder, and a process for preparing the same, the powder being suitable for the preparation of small average grain size sintered bodies which thus may be used for the production of parts or elements improved in dimensional stability and also improved in accuracy and smoothness of the surfaces of the finished articles.

A still further object of this invention is to provide a sintered body of lead-containing oxides which has a high sintered density and small average grain size, thus giving an element improved in dimensional stability and in accuracy and smoothness of the surfaces of the finished articles.

A still further object of this invention is to provide an element for electrical uses with the use of an inexpensive material for electrodes, the element provided by the invention being prepared at a lower baking temperature to give a finished product which has excellent electrical and mechanical properties.

With the objects described above in view, the present invention provides a process for preparing a powder of lead-containing oxides for the production of an element comprising the steps of:

(a) mixing and calcining a powder of a material selected from the group consisting of oxides of metals other than lead, lead-containing metal oxides, metal substances forming said oxides upon calcination and mixtures thereof;

(b) adding and mixing a powder of a lead substance to obtain a mixture; and (c) calcining said mixture at a temperature of from 400° C. to 1200° C.

Further provided by this invention is a powder of lead-containing oxides for the production of an element, comprising a lead oxide and an oxide of at least one metal other than lead, said powder being prepared by mixing and calcining a powder of a material selected from the group consisting of oxides of metals other than lead, lead-containing metal oxides, metal substances forming said oxides upon calcination and mixtures thereof, adding and mixing a powder of a lead substance to obtain a mixture and then calcining the mixture.

The lead-containing oxide powder provided in accordance with the present invention includes a powder of lead-containing oxides for the production of an element, comprising a powder of a Perovskite type lead-containing oxides represented by the formula of $ABO_3$, wherein A is a metal element or elements coordinated with 12 oxygen atoms and containing at least lead, and B is a metal element or elements coordinated with 6 oxygen atoms, a phase containing the lead forming a skin layer of the powder.

Also provided by this invention are a process for preparing a sintered body of lead-containing oxides for the production of an element comprising the steps of molding the aforementioned lead-containing oxide powder, and then sintering the molded mass, and a sintered body prepared thereby.

Also provided by this invention are a process for preparing a lead-containing element comprising the step of baking the molded mass prepared by the first step of the process as described in the preceding paragraph together with an electrode material having a low melting point, and a lead-containing element prepared thereby.

The above and other objects of the invention will become apparent from the following description.

BRIEF DESCRIPTION OF DRAWING

The single FIGURE appended hereto is a graph showing the interrelation between the sintering temperature and the percent shrinkages respectively, of the sintered bodies prepared from the powder of Example 1 embodying the present invention and a control powder of Comparative Example 1.

DESCRIPTION OF THE INVENTION

The present invention will now be described in detail hereinbelow.

In preparation of the powder of lead-containing oxides, according to the invention, prepared at the first step (a) is a material including an oxide of metal other than lead, a lead-containing metal oxide, a metal substance forming the oxide upon calcination or a mixture thereof. When the metal substances forming the oxides upon calcination are used, it is preferred to use those which are converted into metal oxides or lead-containing metal oxides upon calcination without leaving impurities, such as chlorine or other halogens, sulfur or phosphorous, other than the ingredient metals in the composition.

Examples of the metals constituting the oxides of metals other then lead include zirconium (Zr), titanium (Ti), lithium (Li), copper (Cu), magnesium (Mg), nickel (Ni), barium (Ba), calcium (Ca), strontium (Sr), zinc (Zn), manganese (Mn), cobalt (Co), tin (Sn), iron (Fe), cadmium (Cd), antimony (Sb), aluminum (Al), rare earth metals, such as ytterbium (Yb), lanthanum (La), yttrium (Y), samarium (Sm) or cerium (Ce), indium (In), selenium (Se), niobium (Nb), tantalum (Ta), bismuth (Bi), tungsten (W), tellurium (Te), rhenium (Re) and mixtures thereof. The expression lead-containing metal oxides," used throughout the specification and the appended claims, mean oxides containing lead and one or more of the metals other than lead, as illustratively set forth above.

The metal substances forming the oxides upon calcination include elemental metals, carbonates, oxalates, formates, hydroxides and basic carbonates.

The specific examples of the oxides of metals other than lead and the metal substances forming the oxides upon calcination include $SrCO_3$, $Sr(CH_3COO)_2 \cdot \frac{1}{2}H_2O$, $Sr(OH)_2 \cdot 8H_2O$, $SrO$, $CaCO_3$, $Ca(OH)_2$, $CaO$, $Ba(CH_3COO)_2$, $BaCO_3$, $Ba(HCOO)_2$, $Ba(OH)_2 \cdot 8H_2O$, $BaC_2O_4 \cdot H_2O$, $BaO$, $BaO_2$, $Mg$, $Mg(OH)_2$, $MgC_2O_4 \cdot 2H_2O$, $MgO$, $Mn(CH_3COO)_2 \cdot 4H_2O$, $MnCO_3$, $Mn(HCOO)_2 \cdot 2H_2O$, $Mn$, $Zn$, $ZnO$, $Zn(CH_3COO)_2 \cdot 2H_2O$, $Ni$, $Ni(CH_3COO)_2 \cdot 4H_2O$, $NiCO_3 \cdot 2Ni(OH)_2 \cdot 4H_2O$, $Ni(HCOO)_2 \cdot 2H_2O$, $NiO$, $Ni_2O_3$, $Co$, $Co(CH_3COO)_2 \cdot 4H_2O$, $CoO$, $Y$, $Y_2O_3$, $In$, $In_2O_3$, $Nb$, $Nb_2O_5$, $Ta$, $Ta_2O_5$, $Al$, $Al_2O_3$, $Al(OH)_3$, $Fe$, $FeC_2O_4 \cdot 2H_2O$, $Fe_2O_3$, $Fe_3O_4$, $Zr$, $ZrO_2$, $Ti$, $TiO_2$, and commercially available mixtures containing two or more metal compounds and solid solutions of metal compounds.

It is desirable that the powder containing the oxides of metals other than lead, lead-containing metal oxides, metal substances forming the oxides upon calcination and mixtures thereof has a small particle size and narrow particle distribution. It is also desirable that the metal ingredients in the composition are uniformly distributed or dispersed.

In prepartion, the aforementioned powder is mixed, and then calcined in the step (a). The powder may be mixed in a mortar or a ball mill by the conventional method. However, rather than mixing in the dry process, the mixture may preferably be mixed through the wet process using an alcohol or acetone, since mixing is effected more efficiently in the wet process. It is important that mixing be effected sufficiently in order to increase uniformity of the composition and to enhance the efficiency of the solid phase reaction effected in the subsequent calcination. This greatly influences the electrical characteristics of the product sintered body made of the powders of the invention. For example, when the powders are mixed in the wet process using a ball mill, the period of time for mixing may preferably be 5 to 30 hours, more preferably 10 to 20 hours. If the powders are mixed in less than 5 hours, there may be some cases where mixing is insufficient so as to cause disadvantages in uniformity. On the other hand, it may generally be superfluous to mix the powders over a period of 30 hours. Mixing devices such as a ball mill may preferably be made of organic substances such as nylon since metal impurities will be scarcely incorporated. The balls may preferably be made of zirconia. In a case where aluminum is allowed to be incorporated, the mixing device may be made of aluminum.

The aforementioned powder to be mixed and calcined in the step (a) may preferably have a BET particle size of not more than 1 μm, more preferably not more than 0.5 μm. The BET particle size means a particle size based on the specific surface area and is calculated from the following equation:

$$D = \frac{6}{\rho \cdot S}$$

wherein D is a BET particle size (μm), ρ is true density (g/cm$^3$) and S is specific surface area (m$^2$/g) measured by the BET method.

When the powder has a BET particle size of not more than 1 μm, the sintering property of the powder is increased so that a sintered body having high density and excellent in mechanical characteristics is obtained.

It is desirable that the powders to be mixed and calcined in the step (a) each having a BET particle size of not more than 1 μm be contained in an amount of not less than 60 wt.%, more preferably not less than 70 wt%. When two or more kinds of powders are mixed and calcined in the step (a), it is sufficient if only one kind of powders each having a BET particle size of not more than 1 μm is contained in an amount of not less than 60 wt% based on that one kind of powders and if not less than 3 wt% of that one kind of powders is contained based on all the powders to be mixed and calcined in the step (a). Particularly, when powders of zirconium such as $ZrO_2$ or powders of titanium such as $TiO_2$ each having a BET particle size of not more than 1 μm are employed, effective results are obtainable.

Upon mixing the powders in step (a), it is preferred to add a surface active agent in liquid form to the powders and to mix them together. By the use of the surface active agent, particularly high sintering property can be obtained to that a sintered body having high density is prepared from the powders of lead-containing oxides. The surface active agent which may be used should not contain metals and should be readily vaporized by sintering. The surface active agent includes an aqueous high polymer such as polyvinyl alcohol, polyethylene glycol, methylcellulose, carboxymethylcellulose, ethylcellulose, hydroxypropylcellulose, polyethylene oxide base high polymers, acrylic base high polymers, maleic anhydride base high polymers, starch, alginic acid, guar gum, gum arabic or gelatine; non-ionic surface active agent such as polyoxyethylene alkyl ether; polyvinyl butyral; and waxes. The amount of the surface active agent added differs depending upon the compositions of the lead-containing oxides, types of the starting materials and the types of the surface active agents. Generally, it is preferred that the surface active agent be added in an amount of not more than 5 wt% of the lead-containing oxides to be prepared.

Then the mixture is calcined to allow the ingredient components to react in solid phase. The efficiency of calcination is low when the powder is calcined at a temperature of lower than 700° C. On the other hand, if calcination is carried out at a temperature of higher than 1200° C., the powder particles tend to adhere to each other to form coagulated lumps to lower the reactivity of the calcined product. Accordingly, it is preferred that the powder be calcined at a temperature of from 700° C. to 1200° C., more preferable temperature being 900° C. to 1000° C. If the calcination steps are repeated two or more times, the once calcined product is preferably pulverized and then mixed before it is subjected to subsequent calcination treatment, in order to obtain a more uniform product and to prevent coagulation.

The calcined product obtained in the step (a) may be further pulverized before it is subjected to the step (b) to improve uniformity of particle size of the powders and to prevent coagulation. When pulverization is effected using a device made of organic materials, it is preferred that the powders thus pulverized be subjected to thermal treatment to thereby decompose organic materials. Should such organic materials be present in the step (c), they are converted into carbonaceous materials which give adverse effects on the sintering property of the powders, thereby lowering electrical characteristics of the product sintered body.

In the following step (b) of the process of the invention, a powder of a lead substance is added to the powder of the step (a) to obtain a mixture. Examples of the lead substance used in this step include elemental lead, lead oxide, lead carbonate, basic lead carbonate, lead hydroxide, lead oxalate, lead formate, lead chloride and lead fluoride; and the examples of the specific lead substances are PbO, $Pb_3O_4$, $PbO_2$, Pb, $(PbCO_3)_2 \cdot Pb(OH)_2$, $PbCO_3$, $Pb(CH_3COO)_4$, $Pb(CH_3COO)_2 \cdot Pb(OH)_2$ and mixtures thereof. It is preferred that the particle size of the lead substance powder be small, generally ranging not more than 15 microns, preferably not more than 5 microns, and more preferably not more than 1 micron.

In order to increase dielectric constant and planar coupling coefficient of the product sintered body, the same powder as used in the step (a), that is oxides of metals other than lead, lead-containing metal oxides, metal substances forming the oxides upon calcination or mixtures thereof, may be added and mixed in the step (b). As the powder is quite the same as used in step (a), repeated description is avoided for simplicity. It is preferred that the proportion of the elements other than lead to be added relative to elemental lead be 20 atom% or lower, more preferably 10 atom% or lower since above 20 atom% the reactivity of the powder tends to decrease.

Mixing at this step may be carried out in a mortar or a ball mill by the conventional mixing method. As described hereinbefore in connection with the step (a), it is also important to mix the powders sufficiently in the step (b). When the powders are mixed in the wet process using a ball mill, the powders may be preferably mixed for 5 to 30 hours, more preferably 10 to 20 hours for the same reasons set forth in step (a). Mixing devices such as a ball mill may also be made of organic substances such as nylon to prevent impurities from being incorporated.

Upon mixing the powders in step (b), the same surface active agent as used in step (a) may be added. Since the surface active agent usable in this step is exactly the same as that used in step (a), repeated description is avoided for simplicity. It is necessary that the surface active agent added in the step (b) be completely vaporized before the mixture is subjected to the calcining step (c).

It is desirable that the lead substance powder be mixed in an amount so that the content of lead in the powder of lead-containing oxides, prepared in accordance with the invention, is in excess of not more than 8 mol% of the stoichiometric quantity. This is an important feature, since the content of lead in the product powder affects significantly the reactivity thereof. As the content of lead is increased, the resultant powder becomes more reactive to be sintered at a lower temperature. However, if the powder of lead substance is added in excess, the properties of the sintered body are deteriorated. For this reason, the lead substance powder is mixed in an amount so that the content of lead in the powder of lead-containing oxides is in excess of not more than 8 mol%, preferably not more than 5 mol%, and more preferably not more than 3 mol%.

In the step (c) of the process of the invention, the mixture obtained by the preceding step (b) is calcined at a temperature of from 400° C. to 1200° C. Calcination at this step may be effected in a known electric furnace or other appropriate equipment. Likewise in general processes for calcining lead-containing oxides, calcination at this step (c) is preferably carried out in a sealed furnace or in a lead-containing atmosphere in order to prevent vaporization of lead. The conditions for calcination may be determined either by analyzing the outer skin layer of the powder particle or by appraising the same through the powder X-ray diffractiometry, as will be described in detail hereinafter. The calcination temperature ranges from 400° C. to 1200° C., preferably from 600° C. to 1000° C., and more preferably from 700° L C. to 900° C. The calcination temperature should be limited within the aforementioned range, since the solid phase reaction in the mixed powder is insufficient if it is calcined at a temperature of lower than 400° C., whereas the powder particles become coarse if the calcination temperature is higher than 1200° C.

The powder of lead-containing oxides for the production of various elements, according to the invention, contains a lead oxide and an oxide of at least one metal other than lead. It is desirable that the powder of lead-containing oxides for the production of various elements, according to the invention, contain lead oxides in an amount in excess by not more than 8 mol%, preferably not more than 5 mol% and more preferably not more than 3 mol%, of the stoichiometric amount, when the composition thereof is analyzed. If the powder of the invention has a core portion composed of the oxide of metal other than lead, it is desirable that a skin or surface layer of oxide of lead cover the core portion. On the other hand, the powder of the invention having a core portion composed of the lead-containing metal oxide may desirably have a skin layer covering the core portion and containing lead in a concentration larger than the content of lead in the core portion.

The skin layer of the resultant powder particle may be analyzed through spectrographical methods, such as X-ray photo-electron spectroscopy, electron probe micro-analysis, Auger electron spectroscopy, scanning Auger microscopy, particle induced X-ray emission, ion scattering spectroscopy, angle-resolved X-ray photoelectron spectroscopy, Rutherford backscattering spectroscopy, field ion microscopy-atom probe spectroscopy, secondary ion mass spectroscopy and ion microprobe mass spectroscopy. Although any of the aforementioned analytical methods may be used, it is preferred to use the X-ray photo-electron spectroscope. The powder X-ray diffraction is particularly preferred for the analysis of the powder having a crystalline skin layer.

It is also desirable that each of the powder particles of the finished product powder of the present invention has a crystalline skin layer which shows a peak having a height ranging within 0.01 to 30%, preferably 0.1 to 10%, of the peak height of the mixture prepared in the step (b), when both are analyzed through the powder X-ray diffractiometry. It is preferred that 1 to 80% of the diameter of each of the powder particles be occupied by the wall thicknesses of the skin layer.

The powder of the invention which as a particular utility is a powder of lead-containing oxides for the production of an element for electrical and other various uses, comprising a powder of a Perovskite type lead-containing oxides represented by the general formula of $ABO_3$, wherein A is a metal element or elements coordinated with 12 oxygen atoms and containing at least lead and B is a metal element or elements coordinated with 6 oxygen atoms, a phase containing the lead forming a skin layer of that powder.

In detail, A in the formula $ABO_3$ set forth above is a metal element or elements coordinated with 12 oxygen atoms, and may be substantially pure lead, or lead may be partially substituted for one or more different metal elements. Preferably A in the general formula $ABO_3$ is $Pb_{1-a}M^1{}_a$, wherein $M^1$ is strontium, calcium, barium or a rare earth element, and a is a positive figure of 0 to 0.2 indicating the molar ratio. If the content of $M^1$ exceeds 0.2 mol, the sinterability of the powder is deteriorated due to deficiency of lead. Although lead may be added in an excess amount, the content of lead in the product powder ranges generally within 8 mol% in excess of the stoichiometric quantity, preferably not more then 5 mol% in excess and more preferably not more than 3 mol% in excess of the stoichiometric quantity, so that the powder composition may be represented by $Pb_xBO_3$ (wherein x indicates a positive figure of not more than 1.08). In the formula of $ABO_3$, B is a metal element having 6 coordinated oxygen atoms, which may be a single element or a mixture of plural elements; the specific examples of B in the general formula $ABO_3$ being represented by $(B^{2+}{}_{\frac{1}{3}}, B^{5+}{}_{\frac{2}{3}})$, $(B^{3+}{}_{\frac{1}{2}}, B^{5+}{}_{\frac{1}{2}})$, $(B^{2+}{}_{\frac{1}{2}}, B^{6+}{}_{\frac{1}{2}})$, $B^{4+}$, $(B^{3+}{}_{\frac{2}{3}}, B^{6+}{}_{\frac{1}{3}})$ or $(B^{1+}{}_{\frac{1}{4}}, B^{5+}{}_{\frac{3}{4}})$; wherein $B^{1+}$ is Li or Cu; $B^{2+}$ is Mg, Ni, Zn, Mn, Co, Sn, Fe or Cd; $B^{3+}$ is Mn, Sb, Al, Yb, In, Fe, Co, Se or Y; $B^{4+}$ is Zr or Ti; $B^{5+}$ is Nb, Sb, Ta or Bi; and $B^{6+}$ is W, Te or Re. For instance, when $B^{4+}$ is titanium and A is substantially pure lead, the powder composition is represented by $PbTiO_3$, and when $B^{2+}$ is magnesium and $B^{5+}$ is niobium with the A being substantially pure lead, the powder composition is represented by $Pb(Mg_{\frac{1}{3}}, Nb_{\frac{2}{3}})O_3$. Up to 0.1 mol of an additional component such as maganese, aluminum, iron, nickel or a mixture thereof may be added to 1 mol of the composition represented by the general formula $ABO_3$ to improve the electrical properties of the resultant product, as desired. The sinterability of the powder is significantly deteriorated if the aforementioned additive is added in excess of 0.1 mol per 1 mol of the composition $ABO_3$.

According to a further aspect of the invention, a sintered body or article of lead-containing oxides for the production of electrical elements or sintered bodies for various other applications may be prepared. Such a sintered body may be prepared by molding the powder of the invention to form a molded mass which is sintered at an appropriate temperature. Molding of the powder may be carried out through any of the conventional processes including compression molding, cast molding, sheet molding such as doctor blade molding, extrusion molding and injection molding.

In order to ensure easier molding, to the powder of the invention may be added an organic binder, such as polyvinyl alcohol, ethylcellulose or carboxymethylcellulose; a plasticizer, such as dioctyl phthalate or polyethylene glycol; a dispersing agent, such as glycerin or oleic acid ether; and a solvent, such as ethyl alcohol, trichlene, acetone or water.

The thus obtained molded mass is then sintered at a sintering temperature of from 800° C. to 1300 ° C. to obtain a sintered body of lead-containing oxides and adapted for use as an electrical element or other various applications. In this sintering step, the molded mass is generally left at a relatively low temperature of up to about several hundreds degrees Celsius until the organic compounds contained in the powder are decomposed. It is preferable that sintering is effected in a lead-containing atmosphere so that evaporation of lead from the mass is prevented.

If the sintering temperature is lower than 800° C., a sintered body having a satisfactorily high density cannot be formed; whereas if the sintering temperature is higher than 1300° C., mechanical properties of the sintered product are deteriorated because of excessive growth of sintered particles. The acceptable sintering temperature, thus, ranges generally from 800° C. to 1300° C., preferably from 950° C. to 1200° C. By the use of the powder of lead-containing oxides prepared by the invention, the temperature required for starting thermal shrikage of the sintered body is not higher than 850° C. and a sintered body having a satisfactory density can be produced by sintering the molded mass at a temperature of not higher than 1300° C.

The important merits of the sintered body produced by the invention are that the density thereof is not less than 93% of the theoretical density, and that the grain size of particles forming the sintered body is smaller than that of the conventional sintered body. The density referred to above means the bulk density which may be measured by any suitable method and preferably measured by the Archimedes' method. The theoretical density may be calculated from the result of X-ray diffractiometry. The grain size of the particles forming the sintered body may be measured by ordinary observation method for the fine structure of ceramic material to calculate the average grain size. (See Nobuyasu Mizutani et al, "Ceramic Processing", page 190, published by Giho-do Shuppan Co., Ltd. (1985).

The sintered body, prepared in accordance with the present invention, has the advantageous characteristic as aforementioned, since the powder of lead-containing oxides of the invention is improved in reactivity over the conventional materials so that it can be sintered at a relatively low temperature to form a sintered mass having a density of 93% or more of the theoretical density to hinder adverse growth of grains. The effect of decreasing the grain size, as compared with those of the sintered bodies prepared by the conventional processes, is affected by the individual powder compositions. The advantageous merits or functional effects of the invention can be realized by the use of a variety of compositions processed in accordance with the teaching of the invention, and particularly conspicuous effects are obtained when the present invention is applied to the compositions prepared by admixing a solid solution of $PbTiO_3$-$PbZrO_3$ with $Pb(Mg_{\frac{1}{3}},Nb_{\frac{2}{3}})O_3$, $Pb(Co_{\frac{1}{3}},Nb_{\frac{2}{3}})O_3$, $Pb(Ni_{\frac{1}{3}},Nb_{\frac{2}{3}})O_3$, $Pb(Y_{\frac{1}{2}},Nb_{\frac{1}{2}})O_3$, $Pb(Mn_{\frac{1}{3}},Nb_{\frac{2}{3}})O_3$ or $Pb(Zr_{\frac{1}{3}},Nb_{\frac{2}{3}})O_3$.

The sintered body may be directly used, or after being machined to have a desired shape and dimensions or after electrodes are applied thereto, the sintered body may be used for a variety of applications which will be described in detail hereinafter.

According to yet a further aspect of the invention, an element for electrical or other applications may be prepared by a process comprising the step of molding the powder of lead-containing oxides of the invention similarly as in the aforementioned process for preparing the sintered body to form a molded mass, the step of applying an electrode material selected from the group consisting of low melting point metals and alloys onto the surface of the molded mass, and the step of baking the molded mass together with the thus applied electrode material. The electrode material used for the aforementioned purpose has preferably a melting point of not higher than 1300° C., more preferably not higher than 1150° C. The specific examples thereof include nickel (Ni), zinc (Zn), tin (Sn) and copper (Cu), alloys containing one or more of the metals set forth above, and alloys mainly composed of gold or silver and to which are added one or more additives such as palladium (Pd), copper (Cu), cadmium oxide (CdO), tungsten (W), platinum (Pt), rhodium (Rh), cobalt (Co), chromium (Cr) and nickel (Ni). These alloys are inexpensive, as compared with the platinum base alloys, and hence more favorable for industrial uses.

The element of the invention may be prepared by laminating or attaching any of the low melting point electrode materials onto the surface of the molded mass of the powder of lead-containing oxides, or to the surface of the molded mass is applied the electrode material, followed by baking at a high temperature. The thus produced elements are of satisfactory utility when used in practical assemblies. The low melting point electrode material may be applied onto the surface of the molded mass, for example, by coating or printing a paste of electrode material, by spattering, vacuum deposition or electroplating. A laminated element may be produced by laminating desired numbers of molded mass layers and electrode layers alternately, and then the laminate is pressed to form an integral green material.

The composite green material including the molded mass of the powder of the invention and the electrode material is then baked at a baking temperature of from 800° C. to 1200° C. to produce a finished element made of lead-containing sintered body to which electrodes are attached. At this step, it is preferred that the green material is initially left at a lower temperature of up to several hundreds degrees Celsius until organic substances contained therein are decomposed, and then the temperature is raised to effect baking.

The green material may be baked selectively in either oxidizing or reducing atmosphere depending on the specific kind of the particular electrode material and the properties of the used powder of lead-containing oxides. It is generally recommended that baking is carried out in a lead-containing atmosphere to prevent vaporization of lead.

The ceraminc elements of baked lead-containing oxides, provided by the present invention, may be used for a variety of applications, for example, as a filter for high frequency waves, a filter element for oscillator surface elastic waves, a condenser, a laminated condenser, an actuator element, an infrared ray sensor, a pressure senser, an acceleration senser, an ultrasonic sensor, a light modulator, a polarizer, an optical circuit element, a light signal processor, an electric strain element, an igition element, a resonator, a pressure buzzer, an ultrasonic microphone and an ultrasonic cleaner. According to the present invention, such an element having excellent properties may be produced at a high rate of production.

EXAMPLES OF THE INVENTION

The present invention will be described more specifically by referring to examples thereof.

EXAMPLE 1

Zirconium oxide($ZrO_2$) and titanium oxide($TiO_2$) were mixed together in a ratio such that the atomic ratio of zirconium to titanium was 0.52:0.48, and the mixture was repeatedly processed through alternating wet pulverizaion steps in a ball mill and calcination steps carried out at 900° C., whereby an oxide powder containing zirconium and titanium was prepared. The oxide powder was analyzed through the powder X-ray diffractiometry to learn that the powder has a $ZrTiO_4$ phase. To the $ZrTiO_4$ powder was added lead monooxide to prepare a composition of $Pb(Zr_{0.52}Ti_{0.48})O_3$ to obtain an admixture which was mixed and then calcined at 800° C. for an hour. The resultant powder was analyzed through the powder X-ray diffractiometry to obtain an X-ray diffractiometry chart wherein a peak of lead oxide phase was found, other than the peak of the $Pb(Zr,Ti)O_3$ phase. The strength or height of the peak after calcination was about 5% of the peak height showing the lead oxide phase in the chart obtained after the addition of lead monoxide for the preparation of the composition represented by $Pb(Zr_{0.52}Ti_{0.48})O_3$ and prior to calcination. The result of analysis of the resultant powder showed that it had a composition of $Pb_{1.001}(Zr_{0.519}Ti_{0.481})O_3$, the content of lead being substantially stoichiometric.

Alternatively, a sample prepared by molding the powder under a pressure of 1000 kg/cm² was measured to reveal a thermal shrinkage curve. The result was that shrinkage initiated at a temperature of about 700° C., as shown in the graph. The powder was molded at a molding pressure of 1000 kg/cm² to form a 20 mmφ disk which was sintered at 950° C. for an hour, whereby a sintered body having a density of 7.76 g/cm³ was obtained. In the appended drawing, the percentage shrinkage is a ratio of the extent of shrinkage at respective temperatures, while the maximum shrinkage is taken as 100% (Rate of Temperature Rise: 5° C./minute).

The result of powder X-ray diffractiometry revealed that the sintered body was uniform and composed of a single $Pb(Zr,Ti)O_3$ phase, since no peak corresponding to the lead oxide phase was found in the X-ray diffractiometry chart. The change in content of lead in the depth direction of the powder particle was analyzed through X-ray photoelectron spectrometry to learn that an extremely larger content of lead was found at the vicinity of the surface and the content of lead was decreased at the deeper location. In other words, it was ascertained that a layer containing a larger amount or higher concentration of lead was present at the vicinity of the surface of the powder particle.

COMPARATIVE EXAMPLE 1

Zirconium oxide($ZrO_2$), titanium oxide($TiO_2$) and lead oxide (PbO) were mixed together to obtain a composition of $Pb(Zr_{0.52}Ti_{0.48})O_3$, and the mixture was repeatedly processed through alternating wet pulverization steps in a ball mill and calcination steps carried out at 900° C., whereby a powder of $Pb(Zr_{0.52}Ti_{0.48})O_3$ was obtained. The powder was analyzed through powder X-ray diffractiometry to learn that the powder had a single $Pb(Zr,Ti)O_3$ phase and that there was no PbO phase found. The result of the analysis of the powder composition showed that it had a composition of $Pb_{1.001}(Zr_{0.519}Ti_{0.481})O_3$ and that the content of lead was approximately equal to the stoichiometric content.

A thermal shrinkage curve measured similarly to Example 1 is shown in the appended drawing. As shown, shrinkage initiated at about 900° C., which is as higher as 200° C. than that according to Example 1. Under the same conditions as in Example 1, a sintered body was prepared. The sintered body had a density of 5.01 g/cm³.

After pulverizing the sintered body, the resultant powder was subjected to the powder X-ray diffractiometry to reveal that it had a single $Pb(Zr,Ti)O_3$ phase.

The change in content of lead in the depth direction of the powder particle was analyzed through the X-ray photoelectron spectrometry to learn that the content of lead was more or less the same all through the interior core and the surface portion and that a layer containing a larger amount or higher concentration of lead was not present at the vicinity of the surface of the powder paricle.

EXAMPLE 2

Magnesium oxide(MgO), nobium oxide($Nb_2O_5$), titanium oxide ($TiO_2$), zirconium oxide($ZrO_2$) and manganese oxide($MnO_2$) were mixed so that a composition of $(Mg_{\frac{1}{3}},Nb_{\frac{2}{3}})_{0.4375}Ti_{0.4375}Zr_{0.125}Mn_{0.035}$ was obtained. After calcining the mixture at 900° C. for 3 hours followed by pulverizing by the wet method and then further calcining at 900° C. for 3 hours, lead oxide was added thereto so that a composition represented by the following formula was obtained:

$Pb_{1.00}(Mg_{\frac{1}{3}},Nb_{\frac{2}{3}})_{0.4375}Ti_{0.4375}Zr_{0.125}$ The admixture was calcined at 850° C. for an hour to obtain a powder which was analyzed through powder X-ray diffractiometry to obtain a chart wherein peaks showing the presence of a Perovskite phase and a trace of $3Pb0.2Nb_2O_5$ phase were found. The result of analysis showed that the composition agreed with the following composition within the tolerable error range:

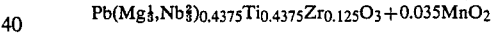

The result of X-ray photoelectron spectrometry showed progressive increase in content of lead at the location closer to the surface of the powder particle.

The shrinkage was initiated at a temperature approximate to 700° C. The powder was sintered, similarly as in Example 1, at 950° C. for 3 hours to obtain a sintered body having a density of 7.68 g/cm³.

COMPARATIVE EXAMPLE 2

Magnesium oxide, niobium oxide, titanium oxide, zirconium oxide, maganese oxide and lead oxide were mixed so that the same composition as in Example 2 and represented by the following formula was prepared: $Pb(Mg_{\frac{1}{3}},Nb_{\frac{2}{3}})_{0.4375}Ti_{0.4375}Zr_{0.125}O_3 + 0.035MnO_2$ After mixing and then calcining at 900° C. for 3 hours, the calcined mass was pulverized in wet condition in a ball mill and further calcined at 900° C. for additional 3 hours to prepare a powder. The result of analysis of the powder through the powder X-ray diffractiometry was approximately the same as that in Example 2 to show the presence of a Perovskite phase and a trace of $3Pb0.2Nb_2O_5$ phase. The result of analysis showed that the composition was agreed with the following composition within the tolerable error range:

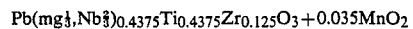

However, the result of X-ray photoelectron spectrometry did not show increase in content of lead at the vicinity of the surface of the powder particle.

It was found that the shrinkage initiation temperature was higher than that of Example 2 by about 200° C.

The powder was sintered at 950° C. for 3 hours to give a processed mass having a density of 5.41 g/cm³, which was considerably lower than that of the sintered body prepared by Example 2, the processed mass being the one which had not been sintered after all.

EXAMPLE 3

Powders of magnesium oxide(MgO), niobium oxide($Nb_2O_5$), titanium oxide($TiO_2$), zirconium oxide($ZrO_2$) and maganese oxide($MnO_2$) were mixed together so that the molar ratio of Mg:Nb:Ti:Zr:Mn was 0.15:0.30:0.40:0.15:0.035. The mixture was repeatedly pulverized in the wet condition followed by calcination at 900° C. alternately. To the thus prepared powder was added lead oxide and the mixture was then calcined at 900° C. for an hour to obtain a composition represented by the formula of:

$$Pb(Mg_{1/3},Nb_{2/3})_{0.45}Ti_{0.40}Zr_{0.15}O_3$$

The powder was analyzed through the powder X-ray diffractiometry to obtain a chart wherein peaks showing the presence of a lead oxide phase and a lead niobate phase ($3Pb0.2Nb_2O_5$), other than a peak showing a solid solution phase of $Pb(Mg_{1/3},Nb_{2/3})_{0.45}Ti_{0.40}Zr_{0.15}O_3$, were found. The peak height of the lead oxide phase was about 3% of the peak height thereof at the time of mixing lead oxide. The composition of the powder was analyzed to learn that the content of lead oxide was substantially equal to the stoichiometic content. The thermal shrinkage curve revealed that shrinkage was initiated at about 700° C.

The result of X-ray photoelectron spectrometry showed that the content of lead was progressively increased at the locations closer to the surface of powder particles.

The powder was molded and sintered at 1050° C. for 2 hours to obtain a sintered body having a density of 7.72 g/cm³.

EXAMPLE 4

Lead oxide(PbO), zirconium oxide($ZrO_2$) and titanium oxide ($TiO_2$) were mixed to obtain a composition containing the metallic elements in a ratio of Pb:Zr:Ti=0.98:0.52:0.48, and the composition was subjected to repeated operation cycles, each cycle comprising the step of wet mixing in a ball mill and the calcination step carried out at 900° C. alternately. The thus prepared powder was analyzed through powder X-ray diffractiometry to reveal that the powder was composed of a single Perovskite phase. To the powder was further added lead oxide to prepare a composition containing the metallic elements in a ratio of Pb:Zr:Ti=1.00:0.52:0.48, followed by mixing and calcination at 800° C. for an hour. The resultant powder had properties substantially comparable to those of the powder prepared by Example 1.

EXAMPLE 5

Magnesium oxide(MgO), niobium oxide($Nb_2O_5$), titanium oxide ($TiO_2$), zirconium oxide($ZrO_2$) and manganese oxide($MnO_2$) were mixed together to prepare a composition represented by $(Mg_{1/3},Nb_{2/3})_{0.437\text{-}5}Ti_{0.4375}Zr_{0.125}Mn_{0.035}$ which was calcined at 950° C. for 5 hours and then pulverized in a wet condition in a ball mill for 10 hours. The same calcination and pulverization cycle was repeated for an additional two times to prepare 9.8036 g of a powder, to which added was 23.3244 g of lead oxide, followed by calcination at 780° C. for an hour. The thus prepared powder was analyzed through powder X-ray diffractiometry to obtain a chart wherein peaks showing a Perovskite phase and a lead oxide phase were found. The peak height of lead oxide was 0.1% of the peak height of lead oxide phase measured at the time of adding and mixing lead oxide. The powder was molded under a pressure of 1000 kg/cm² to form a 20 mmφ disk which was sintered at 950° C. for an hour to obtain a sintered body having a density of 7.78 g/cm³. The powder was analyzed to ascertain that the content of lead in the composition was substantially equal to the stoichiometric content. The thermal shrinkage curve showed that shrinkage was initiated at about 700° C., similarly as in Example 1. The result of X-ray photoelectron spectrometry revealed that the content of lead was increased progressively at the locations closer to the surface of each powder particle.

EXAMPLE 6

Magnesium oxide(MgO), niobium oxide($Nb_2O_5$) and titanium oxide($TiO_2$) were mixed together to prepare a composition represented by $Mg_{1/3},Nb_{2/3})_{0.65}Ti_{0.35}$ which was calcined at 950° C. for 5 hours and then pulverized in a wet condition in a ball mill for 10 hours. The calcination and pulverization cycle was repeated for an additional two times to obtain 9.4284 of a powder to which was added and with which was mixed 22.5432 g of lead oxide and the mixture then calcined at 780° C. for an hour. The thus prepared powder was analyzed through powder X-ray diffractiometry to obtain a chart wherein peaks showing a Perovskite phase and a lead oxide phase were found. The peak height of lead oxide was 0.1% of the peak height of lead oxide phase measured at the time of adding and mixing lead oxide. The powder was molded under a pressure of 1000 kg/cm² to form a 20 mmφ disk which was sintered at 950° C. for an hour to obtain a sintered body having a density of 7.70 g/cm³. The powder was analyzed to ascertain that the content of lead in the composition was substantially equal to the stoichiometric content. The thermal shrinkage curve showed that shrinkage was initiated at about 700° C., similarly as in Example 1.

The result of X-ray photoelectron spectrometry revealed that the content of lead was increased progressively at the locations closer to the surface of each powder particle.

EXAMPLE 7

Magnesium oxide(MgO), niobium oxide($Nb_2O_5$), titanium oxide ($TiO_2$), zirconium oxide($ZrO_2$) and manganese oxide($MnO_2$) were mixed together to prepare a composition represented by $(Mg_{1/3},Nb_{2/3})_{0.437\text{-}5}Ti_{0.4375}Zr_{0.125}Mn_{0.035}$ which was calcined at a temperature between 900° C. and 1000° C. for 3 hours, followed by pulverization in a wet condition in a ball mill for 20 hours, to prepare a powder having a specific surface area (measured by the BET Method of 6.98 m²/g.

To the thus prepared powder was added a $Pb_3O_4$ powder so that a composition containing 1 mol of Pb and represented by the formula of $Pb(Mg_{1/3},Nb_{2/3})_{0.437\text{-}5}Ti_{0.4375}Zr_{0.125}O_3+0.035\ MnO_2$ was formed. The $Pb_3O_4$ powder was added such that the total mixing ratio of Pb ranged within a molar ratio of 1.00 to 1.10, as shown in Table 1. The composition was mixed in a wet condition for 2 hours, followed by calcination at a temperature between 750° C. and 800° C. for an hour, to prepare a powder which was molded under a pressure of 1000 kg/cm² to form a 20 mmφ disk. The thus molded disk was sintered at a temperature between 950° C. and 1150° C. to obtain a sintered body. Table 1 shows the density, average particle size and planar coupling coefficient of each of the sintered bodies prepared by changing the added amount of Pb₃O₄ powder and changing the sintering temperature.

The average particle size was determined by the following method. The surface of each sintered body was observed through an electron microscope and a straight line traversing across at least 100 grains of fine sintered structure was drawn arbitrarily over the surface of the sintered body. The segmental lengths L of the straight line crossing or striding over respective grains were measured and the average value was calculated from the data.

The planar coupling coefficient Kp was determined in accordance with EMAS-6001 Method (Electronic Materials Manufacturers Association Standard). In detail, a disk-shaped specimen having a diameter of 15 to 20 mmφ and a thickness of 0.4 to 0.6 mm was prepared and silver electrodes applied thereto by baking. The factors fr and fa were measured using a vector impedance meter circuit, and the coefficient Kp was calculated from the following equation of:

$$\frac{1}{Kp^2} = 0.395 \frac{fr}{fa - fr} + 0.574$$

wherein fa is a resonant frequency and fr is an anti-resonant frequency.

COMPARATIVE EXAMPLE 3

Magnesium oxide, niobium oxide, titanium oxide, zirconium oxide, manganese oxide and Pb₃O₄, the starting materials used being the same as used in Example 7, were mixed concurrently at one time to prepare a composition represented by:

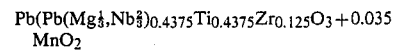

$$Pb(Pb(Mg_{\frac{1}{3}},Nb_{\frac{2}{3}}))_{0.4375}Ti_{0.4375}Zr_{0.125}O_3 + 0.035\ MnO_2$$

After mixing, the composition was calcined at a temperature between 800° C. and 850° C. for 2 hours to obtain a sintered body. Table 1 shows the properties of each of the sintered bodies prepared by changing the sintering temperature.

TABLE 1

| Run No. | Pb Molar Ratio | Specific Surface Area (m²/g) | Density of Molded Mass (g/cm³) | (%) | Sintering Temp. (°C.) | Density of Sintered Body (g/cm³) | (%) | Av. Grain Size of Sintered Body | Planar Coupling Coefficient Kp (%) |
|---|---|---|---|---|---|---|---|---|---|
| 1 | 1.00 | 2.12 | 4.62 | 57.8 | 1150 | 7.73 | 96.6 | 4.47 | 40.2 |
| 2 | 1.005 | 2.11 | 4.68 | 58.5 | 1150 | 7.86 | 98.3 | 4.51 | 41.1 |
| 3 | 1.01 | 2.03 | 4.71 | 58.9 | 1100 | 7.14 | 89.3 | 1.98 | 39.0 |
|   |      |      |      |      | 1150 | 7.87 | 98.4 | 4.48 | 40.6 |
| 4 | 1.015 | 2.08 | 4.73 | 59.1 | 1050 | 7.86 | 98.3 | 2.51 | 41.8 |
|   |      |      |      |      | 1100 | 7.94 | 99.3 | 2.72 | 41.3 |
|   |      |      |      |      | 1150 | 7.90 | 98.8 | 4.62 | 40.8 |
| 5 | 1.02 | 2.13 | 4.78 | 59.8 | 1050 | 7.87 | 98.4 | 2.80 | 40.6 |
|   |      |      |      |      | 1100 | 7.85 | 98.1 | 2.84 | 41.1 |
|   |      |      |      |      | 1150 | 7.87 | 98.4 | 4.71 | 41.0 |
| 6 | 1.025 | 2.06 | 4.77 | 59.6 | 950 | 7.04 | 88.0 | 1.03 | 36.9 |
|   |      |      |      |      | 1050 | 7.88 | 98.5 | 2.78 | 41.2 |
|   |      |      |      |      | 1100 | 7.88 | 98.5 | 2.82 | 40.8 |
|   |      |      |      |      | 1150 | 7.89 | 98.6 | 4.69 | 40.9 |
| 7 | 1.03 | 2.10 | 4.78 | 59.8 | 950 | 7.87 | 98.4 | 1.40 | 37.2 |
|   |      |      |      |      | 1050 | 7.86 | 98.3 | 2.80 | 40.7 |
|   |      |      |      |      | 1100 | 7.91 | 98.9 | 2.86 | 41.1 |
|   |      |      |      |      | 1150 | 7.90 | 98.8 | 4.80 | 40.9 |
| 8 | 1.08 | 1.82 | 4.79 | 59.9 | 950 | 7.90 | 98.8 | 1.62 | 37.0 |
|   |      |      |      |      | 1050 | 7.83 | 97.9 | 7.10 | 38.9 |
|   |      |      |      |      | 1100 | 7.80 | 97.5 | 11.38 | 39.8 |
|   |      |      |      |      | 1150 | 7.73 | 96.6 | 12.13 | 40.1 |
| 9 | 1.10 | 1.51 | 4.89 | 61.1 | 950 | 7.90 | 98.8 | 1.81 | — |
|   |      |      |      |      | 1050 | 7.81 | 97.6 | 8.35 | — |
|   |      |      |      |      | 1100 | 7.78 | 97.3 | 13.2 | — |
|   |      |      |      |      | 1150 | 7.76 | 97.0 | 14.1 | — |
| Com. Ex. 3 | 1.00 | 1.50 | 4.91 | 61.4 | 950 | 4.92 | 61.5 | 1.01 | 6.9 |
|   |      |      |      |      | 1050 | 5.13 | 64.1 | 1.05 | 11.6 |
|   |      |      |      |      | 1100 | 5.48 | 68.5 | 1.18 | 28.2 |
|   |      |      |      |      | 1150 | 6.42 | 80.3 | 4.52 | 31.8 |
|   |      |      |      |      | 1250 | 7.52 | 94.0 | 10.32 | 40.7 |

EXAMPLE 8

Zinc oxide(ZnO), niobium oxide (Nb₂O₅), titanium oxide(TiO₂) and zirconium oxide(ZrO₂) were mixed together to prepare a mixture for the production of a composition represented by the formula of:

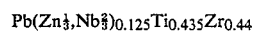

$$Pb(Zn_{\frac{1}{3}},Nb_{\frac{2}{3}})_{0.125}Ti_{0.435}Zr_{0.44}$$

which was calcined at a temperature between 900° C. and 1000° C. for 3 hours. The calcined mass was pulverized in a wet condition in a ball mill for 20 hours to obtain a powder to which was added Pb₃O₄ in an amount so that the added quantity was 1.035 molar ratio of the stoichiometric content of Pb in the formula set forth above. After admixing in a wet condition for 2 hours, the admixture was calcined at a temperature between 800° C. and 850° C. for an hour. Test samples were prepared by changing the sintering temperature as shown in Table 2. The properties of the sample powders and the properties of sintered bodies produced therefrom are also shown in Table 2.

COMPARATIVE EXAMPLE 4

All of the same starting materials as used in Example 8 were mixed together at one time to prepare a mixture for the production of a composition represented by the formula set forth in Example 8. After mixing in a wet condition for 2 hours, sample powders were calcined at 800° C. to 850° C. for 2 hours. The sintering temperatures of sample powders and the properties of the sintered bodies are shown in Table 2.

EXAMPLE 9

Nickel oxide(NiO), niobium oxide($Nb_2O_5$), titanium oxide($TiO_2$) and zirconium oxide($ZrO_2$) were mixed together to prepare a mixture for the production of a composition represented by the formula of:

$$Pb(Ni_{\frac{1}{3}}, Nb_{\frac{2}{3}})_{0.125}Ti_{0.435}Zr_{0.44}$$

which was calcined at a temperature between 900° C. and 1000° C. for 3 hours. The calcined mass was pulverized in a wet condition in a ball mill for 20 hours to obtain a powder which was added with $Pb_3O_4$ in an amount so that the added quantity was 1.035 molar ratio of the stoichiometric content of Pb in the formula set forth above. After admixing in a wet condition for 2 hours, the admixture was calcined at a temperature between 800° C. and 850° C. for an hour. Test samples were prepared by changing the sintering temperature as shown in Table 2. The properties of the sample powders and the properties of sintered bodies produced therefrom are also shown in Table 2.

COMPARATIVE EXAMPLE 5

All of the same starting materials as used in Example 9 were mixed together at one time to prepare a mixture for the production of a composition represented by the formula set forth in Example 9. After mixing in a wet condition for 2 hours, sample powders were calcined at 800° C. to 850° C. for 2 hours. The sintering temperatures of the sample powders and the properties of the sintered bodies are shown in Table 2.

EXAMPLE 10

Cobalt oxide(CoO), niobium oxide($Nb_2O_5$), titanium oxide($TiO_2$) and zirconium oxide($ZrO_2$) were mixed together to prepare a mixture for the production of a composition represented by the formula of:

$$Pb(Co_{\frac{1}{3}}, Nb_{\frac{2}{3}})_{0.125}Ti_{0.435}Zr_{0.44}$$

which was calcined at a temperature between 900° C. and 1000° C. for 3 hours. The calcined mass was pulverized in a wet condition in a ball mill for 20 hours to obtain a powder to which was added $Pb_3O_4$ in an amount so that the added quantity was 1.035 molar ratio of the stoichiometric content of Pb in the formula set forth above. After admixing in a wet condition for 2 hours, the admixture was calcined at a temperature between 800° C. and 850° C. for an hour. Test samples were prepared by changing the sintering temperature as shown in Table 2. The properties of the sample powders and the properties of sintered bodies produced therefrom are also in Table 2.

COMPARATIVE EXAMPLE 6

All of the same starting materials as used in Example 10 were mixed together at one time to prepare a mixture for the production of a composition represented by the formula set forth in Example 10. After mixing in a wet condition for 2 hours, sample powders were calcined at 800° C. to 850° C. for 2 hours. The sintering temperatures of sample powders and the properties of the sintered bodies are shown in Table 2.

TABLE 2

| | Specific Surface Area ($m^2/g$) | Density of Molded Mass ($g/cm^3$) | Density of Molded Mass (%) | Sintering Temp. (°C.) Sintered for one hour | Density of Sintered Body ($g/cm^3$) | Density of Sintered Body (%) | Ave. Grain Size of Sintered Body | Planar Coupling Coefficient Kp (%) |
|---|---|---|---|---|---|---|---|---|
| Ex. 8 | 2.21 | 4.73 | 59.1 | 1050 | 7.82 | 97.8 | 2.12 | 61.2 |
| | | | | 1150 | 7.81 | 97.6 | 4.21 | 62.0 |
| | | | | 1280 | 7.80 | 97.5 | 8.82 | 62.1 |
| Com. Ex. 4 | 1.81 | 4.78 | 59.8 | 1150 | 6.10 | 76.3 | 2.36 | 42.1 |
| | | | | 1280 | 7.53 | 94.1 | 8.11 | 60.0 |
| Ex. 9 | 2.11 | 4.71 | 58.9 | 1050 | 7.87 | 98.4 | 2.30 | 64.0 |
| | | | | 1150 | 7.86 | 98.3 | 4.67 | 65.6 |
| | | | | 1250 | 7.84 | 98.0 | 8.55 | 65.8 |
| Com. Ex. 5 | 1.65 | 4.81 | 60.1 | 1150 | 6.38 | 79.8 | 3.88 | 45.2 |
| | | | | | 1250 | 7.50 | 93.8 | 8.42 | 64.1 |
| Ex. 10 | 2.03 | 4.68 | 58.5 | 1050 | 7.73 | 96.6 | 1.82 | 60.5 |
| | | | | 1150 | 7.74 | 96.8 | 3.63 | 61.2 |
| | | | | 1250 | 7.82 | 97.8 | 6.12 | 62.1 |
| Com. Ex. 6 | 1.68 | 4.76 | 59.5 | 1150 | 6.43 | 80.4 | 2.18 | 41.6 |
| | | | | 1250 | 7.53 | 94.1 | 5.82 | 60.1 |

EXAMPLE 11

A powder of $ZrO_2$ and a powder of $TiO_2$ were mixed together in a ratio such that the atomic ratio of Zr:Ti was 0.52:0.48, and the mixture was calcined at a temperature of from 900° C. to 1000° C. for 5 hours and then the calcined mixture was pulverized. The calcination and pulverization steps were repeated to prepare a powder having a particle size of about 1 micron, to which was added a powder of PbO so that a composition represented by $Pb(Zr_{0.52}Ti_{0.48})O_3$ was obtained. The admixture was then calcined at 800° C. for an hour. The thus prepared powder was charged into a mold and subjected to compression molding to form a 20 mm$\phi$ disk. An Ag-Pd system alloy paste for forming electrodes and having a melting point of 1100° C. was applied onto the surface of the disk, followed by thermal treatment for removing organic substances, and then the disk was pressed again to attach the electrodes. The disk with the attached electrodes was then sintered at 950° C. for 3 hours. The electrodes on the resultant lead-containing ceramic element were maintained in satisfactory condition without particular fault or damage. The characteristics of the electrical element, thus produced, were measured to learn that it had a planar coupling coefficient Kp of 51% and a dielectric constant of 1130.

For reference purposes, another sample of lead-containing ceramic element was produced generally following to procedures under conditions similar to those described above, except that the electrodes were applied and attached after sintering step. The thus produced element had the properties comparable to those of the element formed precedingly in this Example. It is thus proved that electrodes may be applied either prior to or after sintering, when utilizing the teaching of the present invention, and that the element provided by the invention can be applied for laminated elements, such as actuator elements.

EXAMPLE 12

Powders of MgO, $Nb_2O_5$ and $TiO_2$ were weighed and mixed together to prepare a composition represented by the formula of $Pb[(Mg_{1/3},Nb_{2/3})_{0.55}Ti_{0.35}]O_3$, and the mixture was calcined at a temperature between 900° C. and 1000° C. followed by pulverization. The calcination and pulverization steps were repeated to prepare a powder which was added a PbO powder to so that the aforementioned composition was formed, and calcined at 780° C. for an hour after intimate mixing. The thus prepared powder was subjected to compression molding to form a disk having a diameter of 20 mm. An Ag-Pd system alloy paste for forming electrodes and having a melting point of 1100° C. was applied onto the disk. After treating the disk by heat to remove organic substances, the disk was pressed again to attach the electrodes thereon. The thus molded mass was sintered at 950° C. for 3 hours.

The electrodes on the resultant lead-containing ceramic element were maintained in satisfactory condition without particular fault or damage. The characteristics of the electrical element thus produced were measured to learn that it had a planar coupling coefficient Kp of 57% and a dielectric constant of 3600.

For reference purposes, another sample of lead-containing ceramic element was produced generally following the procedures under similar conditions those described above, except that the electrodes were applied and attached after the sintering step. The thus produced element had the properies comparable to those of the element formed by the procedures set forth hereinbefore.

EXAMPLES 13 TO 27

Powders of commercially available reagent grade of each of $ZrO_2$, $TiO_2$, MgO, $Nb_2O_5$ and $MnO_2$ were classified by the air elutriation method depending on particle size so that one group consists of powders each having a BET particle size of 1 μm or smaller and the other group consists of powders each having a BET particle size of larger than 1 μm as shown below.

| Oxide | BET Particle Size (μm) | |
| --- | --- | --- |
| $ZrO_2$ | 0.23 | 1.23 |
| $TiO_2$ | 0.23 | 1.40 |
| MgO | 0.10 | 1.20 |
| $Nb_2O_5$ | 0.33 | 1.65 |
| $MnO_2$ | 0.31 | 1.60 |

The above powders were mixed to have the following composition: $Pbx(Mg_{1/3}Nb_{2/3})_{0.4375}Ti_{0.4375}Zr_{0.125}Mn_{0.035}$ Upon mixing the powders, two groups of powders were used in amounts (wt%) shown in Table 3. Each of the mixtures shown in Table 3 was calcined for 3 hours at 900° to 1100° C. followed by pulverization in a ball mill by the wet process for 20 hours.

Powders of commercially available reagent grade of PbO were added in different amounts shown in Table 3 so that the mixtures had the aforementioned composition (X in Table 3 indicates X in the above composition). Each of the mixtures was then mixed in a ball mill by the wet process for 2 hours.

Each of the mixtures was put in a sealed vessel and was sintered at 700° to 800° C. for one hour followed by molding at a pressure of 1000 Kg/cm² to form a disk having a diameter of 20 mm and a thickness of 1.5 mm. Then, each disk was sintered for one hour at temperatures shown in Table 3.

Density and bending strength of each sintered body thus obtained were measured. The results are shown in Table 3. Incidentally, the density of the sintered body was determined by grinding the sintered body and measuring the external dimensions and weight thereof. The bending strength was determined by forming a sample having a width of 5.0 mm and a thickness of 0.3 mm and measuring by the three point bending method with the span of 10 mm, using the simple type measuring device for bending strength.

TABLE 3

| | | Pb Molar Ratio (Value of X) | Percentage of powders having BET particle size of 1 μm or smaller (wt %) | | | | | Sintering Temp. (°C.) | Density of Sintered Body (g/cm³) | Bending Strength (Kg/cm²) |
| --- | --- | --- | --- | --- | --- | --- | --- | --- | --- | --- |
| | | | $ZrO_2$ | $TiO_2$ | MgO | $Nb_2O_5$ | $MnO_2$ | | | |
| Ex. | 13 | 1.000 | 0 | 60 | 0 | 0 | 0 | 1200 | 7.90 | 1440 |
| | 14 | 1.000 | 0 | 80 | 0 | 0 | 0 | 1200 | 7.92 | 1470 |
| | 15 | 1.000 | 0 | 100 | 0 | 0 | 0 | 1200 | 7.93 | 1510 |
| | 16 | 1.000 | 0 | 100 | 0 | 100 | 0 | 1200 | 7.95 | 1530 |
| | 17 | 1.000 | 100 | 60 | 0 | 0 | 0 | 1200 | 7.93 | 1480 |
| | 18 | 1.000 | 100 | 100 | 100 | 100 | 100 | 1200 | 7.99 | 1650 |
| | 19 | 1.000 | 60 | 60 | 60 | 60 | 60 | 1200 | 7.96 | 1590 |
| | 20 | 1.001 | 0 | 80 | 0 | 0 | 0 | 1150 | 7.97 | 1630 |
| | 21 | 1.001 | 0 | 80 | 0 | 0 | 0 | 1200 | 7.99 | 1660 |
| | 22 | 1.020 | 0 | 80 | 0 | 0 | 0 | 1150 | 7.98 | 1640 |
| | 23 | 1.020 | 0 | 80 | 0 | 0 | 0 | 1200 | 7.97 | 1600 |
| | 24 | 1.000 | 100 | 0 | 0 | 0 | 0 | 1200 | 7.94 | 1520 |

TABLE 3-continued

| | Pb Molar Ratio (Value of X) | Percentage of powders having BET particle size of 1 μm or smaller (wt %) | | | | | Sintering Temp. (°C.) | Density of Sintered Body (g/cm³) | Bending Strength (Kg/cm²) |
|---|---|---|---|---|---|---|---|---|---|
| | | ZrO₂ | TiO₂ | MgO | Nb₂O₅ | MnO₂ | | | |
| 25 | 1.000 | 0 | 0 | 100 | 0 | 0 | 1200 | 7.93 | 1500 |
| 26 | 1.000 | 0 | 0 | 0 | 100 | 0 | 1200 | 7.93 | 1510 |
| 27 | 1.000 | 0 | 0 | 0 | 0 | 100 | 1200 | 7.95 | 1490 |

EXAMPLE 28

Powders of commercially available reagent grade of each of NiO, Nb₂O₅, TiO₂ and ZrO₂ were mixed to have a composition of:

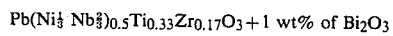

Pb(Ni$_{1/3}$Nb$_{2/3}$)$_{0.5}$Ti$_{0.33}$Zr$_{0.17}$O$_3$ + 1 wt% of Bi₂O₃

The mixture was calcined for 3 hours at 950° to 1050° C. and was pulverized in a ball mill twice.

Powders of commercially available reagent grade of each of PbO and Bi₂O₃ were added and mixed followed by calcination for one hour at 750° to 850° C.

The powders thus obtained were molded under a pressure of 1000 Kg/cm² to form a disk having a diameter of 20 mm, which was sintered for one hour at 1150° to 1200° C. After the disk was ground to have a thickness of 0.5 mm, silver electrodes were attached to both sides of the disk to measure electrical characteristics. Then, 3 KV/mm of direct current was passed for 30 minutes for polarization treatment in silicone oil of 80° to 100° C. The results of measurement revealed that the dielectric constant $\epsilon_{33}^T$ was 7120 and the planar coupling coefficient Kp was 56.2%.

EXAMPLE 29

Powders of commercially available reagent grade of each of SrCO₃, MgO, Nb₂O₅, TiO₂ and ZrO₂ were mixed to prepare a composition of:

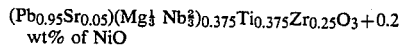

(Pb$_{0.95}$Sr$_{0.05}$)(Mg$_{1/3}$Nb$_{2/3}$)$_{0.375}$Ti$_{0.375}$Zr$_{0.25}$O$_3$ + 0.2 wt% of NiO

The mixture was calcined for 3 hours at 1000° to 1100° C. and was pulverized twice in a ball mill.

Powders of commercially available reagent grade of each of PbO and NiO were added and mixed followed by calcination for one hour at 750° to 850° C.

Similarly as in Example 28, a disk was formed from the powder mixture thus obtained by molding at a pressure of 1000 Kg/cm² and was then sintered at 1200° to 1300° C. for one hour. The electrical characteristics were measured. The results showed that the dielectric constant $\epsilon_{33}^T$ was 5430 and the planar coupling coefficient Kp was 64.1%.

EXAMPLE 30

The procedures of Example 29 were repeated except that powders of solid solution of Pb and Ni were used in place of reagent grade powders of PbO and NiO. Similar electrical measurement as in Example 28 showed that the dielectric constant $\epsilon_{33}^T$ was 5640 and the planar coupling coefficient Kp was 64.2%.

EXAPLES 31 to 34

Powders of commercially available reagent grade of each of ZrO₂, TiO₂, MgO, Nb₂O₅ and MnO₂ were weighed to prepare a composition of:

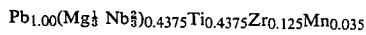

Pb$_{1.00}$(Mg$_{1/3}$Nb$_{2/3}$)$_{0.4375}$Ti$_{0.4375}$Zr$_{0.125}$Mn$_{0.035}$

Each of aqueous solutions of surface active agents shown in Table 4 was added in an amount of 1.8 times by weight of the powders and was mixed in a ball mill for 5 hours. Each of the mixtures thus obtained was filtered, dried and pulverized followed by calcination at 1000° C. for 2 hours. The mixtures were pulverized in a ball mill for 10 hours by the wet process.

Powders of PbO (reagent grade) were added to prepare the above composition and mixed in a ball mill by the wet process for 2 hours. The thus obtained powder mixtures were respectively put in a sealed vessel and calcined at 700° to 800° C. for one hour.

Then, disks (diameter 20 mm, thickness 1.5 mm) were formed by molding the powder mixtures under a pressure of 1000 Kg/cm² and then sintered at 1200° C. for one hour. Similarly as in Examples 13 to 27, the density and bending strength of each of the sintered bodies were measured. The results are shown in Table 4.

TABLE 4

| | | Surface Active Agent | Density of Sintered Body (g/cm³) | Bending Strength (Kg/cm²) |
|---|---|---|---|---|
| Ex. | 31 | 0.08 wt % aqueous solution of polyvinyl alcohol (hydrolysis degree of 90%, polymerization degree of 1700) | 7.95 | 1420 |
| | 32 | 0.8 wt % aqueous solution of methylcellulose (Trade Name "Metolose" SM25 available from Shin-Etsu Chemical Co., Ltd.) | 7.94 | 1380 |
| | 33 | 0.3 wt % aqueous solution of hydroxypropyl methylcellulose (Trade Name "Metolose" 60SH50 available from Shin-Etsu Chemical Co., Ltd.) | 7.94 | 1390 |
| | 34 | 0.2 wt % aqueous solution of polyethylene oxide (Trade Name "PEO-1" available from Seitetsu Kagaku Co., Ltd.) | 7.93 | 1320 |

Although the present invention has been described with reference to the specific examples, it should be understood thaat various modifications and variations can be easily made by those skilled in the art without departing from the spirit of the invention. Accordingly, the foregoing disclosure is to be interpreted as illustrative only and not to be interpreted in a limiting sense. The present invention is limited only by the scope of the following claims.

What is claimed is:

1. A process for preparing a powder of lead-containing oxides for the production of an element comprising the steps of:
   (a) mixing and calcining a powder of a material selected from the group consisting of titanium oxide, lead-containing titanium oxide, metal substances forming said titanium oxide upon calcination and mixtures thereof with or without a powder of a material selected from the group consisting of oxides of metals other than lead, lead-containing metal oxides, metal substances forming said oxides upon calcination and mixtures thereof, the metal constituting said oxides of metals other than lead being selected from the group consisting of zirconium (Zr), lithium (Li), copper (Cu), magnesium (Mg), nickel (Ni), barium (Ba), calcium (Ca), strontium (Sr), zinc (Zn), manganese (Mn), cobalt (Co), tin (Sn), iron (Fe), cadmium (Cd), antimony (Sb), aluminum (Al), rare earth metals, indium (In), selenium (Se), niobium (Nb), tantalum (Ta), bismuth (Bi), tungsten (W), tellurium (Te), rhenium (Re) and mixtures thereof, said metal substances forming said oxides upon calcination being selected from the group consisting of elemental metals, metal carbonates, metal oxalates, metal formates, metal hydroxides and basic metal carbonates;
   (b) adding and mixing a powder of a lead substance to obtain a mixture, said lead substance being selected from the group consisting of PbO, $Pb_3O_4$, $PbO_2$, Pb, $(PbCO_3)_2 \cdot Pb(OH)_2$, $PbCO_3$, $Pb(CH_3COO)_4$, $Pb(CH_3COO)_2 \cdot Pb(OH)_2$ and mixtures thereof; and
   (c) calcining said mixture at a temperature of from 400° C. to 1200° C.

2. The process according to claim 1, wherein the calcination in said step (a) is carried out at a temperature of from 700° C. to 1200° C.

3. The process according to claim 1, wherein said lead substance is added in said step (b) in an amount so that the content of lead in the resultant lead-containing oxide powder is in excess of not more than 8 mol% of the stoichiometric content.

4. The process according to claim 1, wherein said powders of said material each having a BET particle size of not more than 1 μm are contained in an amount of not less than 60 wt%.

5. The process according to claim 1, wherein in said step (b) a powder of a material selected from the group consisting of oxides of metals other than lead, lead-containing metal oxides, metal substances forming said oxides upon calcination and mixtures thereof is further added and mixed.

6. The process according to claim 5, wherein the metal constituting said oxides of metals other than lead is selected from the group consisting of zirconium (Zr), titanium (Ti), lithium (Li), copper (Cu), magnesium (Mg), nickel (Ni), barium (Ba), calcium (Ca), strontium (Sr), zinc (Zn), manganese (Mn), cobalt (Co), tin (Sn), iron (Fe), cadmium (Cd), antimony (Sb), aluminum (Al), rare earth metals, indium (In), selenium (Se), niobium (Nb), tantalum (Ta), bismuth (Bi), tungsten (W), tellurium (Te), rhenium (Re) and mixtures thereof.

7. The process according to claim 5, wherein said metal substances forming said oxides upon calcination are selected from the group consisting of elemental metals, metal carbonates, metal oxalates, metal formates, metal hydroxides and basic metal carbonates.

8. The process according to claim 1, wherein in said step (a) a surface active agent in liquid form is further added and mixed.

9. The process according to claim 8, wherein said surface active agent is selected from the group consisting of polyvinyl alcohol, polyethylene glycol, methylcellulose, carboxymethylcellulose, ethylcellulose, hydroxypropylcellulose, polyethylene oxide base high polymers, acrylic base high polymers, maleic anhydride base high polymers, starch, alginic acid, guar gum, gum arabi, gelatine, polyoxyethylene alkyl ether, polyvinyl butyrol and waxes.

10. The process according to claim 8, wherein said surface active agent is added in an amount of not more than 5 wt% of the lead-containing oxides.

11. The process according to claim 1 further comprising between said steps (a) and (b) a step of pulverizing a calcined body of said powder of said material after being calcined in said step (a).

12. The process according to claim 11 further comprising a step of decomposing organic materials contained in said powder of said material by thermal treatment after said step of pulverizing the calcined body.

13. A powder of lead-containing oxides for the production of an element comprising a lead oxide and an oxide of at least one metal other than lead, said powder being prepared by mixing and calcining a powder of a material selected from the group consisting of titanium oxide, lead-containing titanium oxide, metal substances forming said titanium oxide upon calcination and mixtures thereof with or without a powder of a material selected from the group consisting of oxides of metals other than lead, lead-containing metal oxides, metal substances forming said oxides upon calcination and mixtures thereof, the metal constituting said oxides of metals other than lead being selected from the group consisting of zirconium (Zr), lithium (Li), copper (Cu), magnesium (Mg), nickel (Ni), barium (Ba), calcium (Ca), strontium (Sr), zinc (Zn), manganese (Mn), cobalt (Co), tin (Sn), iron (Fe), cadmium (Cd), antimony (Sb), aluminum (Al), rare earth metals, indium (In), selenium (Se), niobium (Nb), tantalum (Ta), bismuth (Bi), tungsten (W), tellurium (Te), rhenium (Re) and mixtures thereof, said metal substances forming said oxides upon calcination being selected from the group consisting of elemental metals, metal carbonates, metal oxalates, metal formates, metal hydroxides and basic metal carbonates;
   adding and mixing a powder of a lead substance to obtain a mixture, said lead substance being selected from the group consisting of PbO, $Pb_3O_4$, $PbO_2$, Pb, $(PbCO_3)_2 \cdot Pb(OH)_2$, $(Pb(CH_3COO)_4$, $Pb(CH_3COO)_2 \cdot Pb(OH)_2$ and mixtures thereof; and then calcining the mixture.

14. The powder according to claim 13, wherein the content of said lead in the lead-containing oxides is in excess of not more than 8 mol% of the stoichiometric amount.

15. The powder according to claim 13, wherein said powder of lead-containing oxides has a skin layer, said skin layer being substantially composed of the oxide of lead, and wherein a core of each of the powder is substantially composed of the oxide of metals other than lead.

16. The powder according to claim 13, wherein said powder of lead-containing oxides has a skin layer, said skin layer and a core of each of the powder being substantially composed of said lead-containing oxides, and wherein a content of lead in said skin layer is larger than that in said core.

17. The powder according to claim 15, wherein the height of peak in the diffractiometry chart obtained by analyzing said skin layer by the powder X-ray diffractiometry is within the range of from 0.01 to 30% of that in the diffractiometry chart of a mixture of the powder in said material and the powder of the lead substance.

18. The powder according to claim 15, wherein the thickness of said skin layer is such that 1 to 80% of the diameter of each of the powder is occupied by the wall thickness of said skin layer.

19. The powder according to claim 13, wherein said powders of said material each having a BET particle size of not more than 1 μm are contained in an amount of not less than 60 wt%.

20. The powder according to claim 13, wherein a surface active agent in liquid form is further added to and mixed with said powder of said material selected from the group consisting of oxides of metals other than lead, lead-containing metal oxides, metal substances forming said oxides upon calcination and mixtures thereof.

21. The powder according to claim 20, wherein said surface active agent is selected from the group consisting of polyvinyl alcohol, polyethylene glycol, methylcellulose, carboxymethylcellulose, ethylcellulose, hydroxypropylcellulose, polyethylene oxide base high polymers, acrylic base high polymers, maleic anhydride base high polymers, starch, alginic acid, guar gum, gum arabi, gelatine, poloxyethylene alkyl ether, polyvinyl butyral and waxes.

22. The powder according to claim 20, wherein said surface active agent is added in an amount of not more than 5 wt% of the lead-containing oxides.

23. The powder according to claim 13, wherein in addition to said lead substance a powder of a material selected from the groupconsisting of oxides of metals other than lead, lead-containing metal oxides, metal substances forming said oxides upon calcination and mixtures thereof is further added and mixed to obtain said mixture.

24. The powder according to claim 23, wherein the metal constituting said oxides of metals other than lead is selected from the group consisting of zirconium (Zr), titanium (Ti), lithium (Li), copper (Cu), magnesium (Mg), nickel (Ni), barium (Ba), calcium (Ca), strontium (Sr), zinc (Zn), manganese (Mn), cobalt (Co), tin (Sn), iron (Fe) cadmium (Cd), antimony (Sb), aluminum (Al), rare earth metals, indium (In), selenium (Se), niobium (Nb), tantalum (Ta), bismuth (Bi), tungsten (W), tellurium (Te), rhenium (Re) and mixtures thereof.

25. The powder according to claim 23, wherein said metal substances forming said oxides upon calcination are selected from the group consisting of elemental metals, metal carbonates, metal oxalates, metal formates, metal hydroxides and basic metal carbonates.

26. The powder according to claim 13, wherein after said powder of said material selected from the group consisting of oxides of metals other than lead, lead-containing metal oxides, metal substances forming said oxides upon calcination and mixtures thereof is mixed and calcined, the calcined body of said powder is pulverized.

27. The powder according to claim 26, wherein after said calcined body of said powder is pulverized, organic materials contained in the powder are decomposed by thermal treatment.

28. A sintered body of lead-containing oxides for the production of an element, said sintered body being prepared by molding said powder as defined in claim 13 followed by sintering.

29. A process for preparing a sintered body of lead-containing oxides for the production of an element comprising the steps of molding said powder as defined in claim 13 to obtain a molded mass and sintering the molded mass at a temperature of from 800° C. to 1300° C.

30. The powder according to claim 16, wherein the height of peak in the diffractiometry chart obtained by analyzing said skin layer by the powder X-ray diffractiometry is within the range of from 0.01 to 30% of that in the diffractiometry chart of a mixture of the powder of said material and the powder of the lead substance.

* * * * *